United States Patent [19]
Cachera

[11] 3,932,217
[45] Jan. 13, 1976

[54] METHOD AND DEVICE FOR THE PASSIVE PROTECTION OF A NUCLEAR REACTOR

[75] Inventor: Pierre Charles Cachera, Montesson, France

[73] Assignee: Electricite de France, Paris, France

[22] Filed: Nov. 30, 1973

[21] Appl. No.: 420,363

[30] Foreign Application Priority Data
Dec. 20, 1972 France .............................. 72.45541
Aug. 31, 1973 France .............................. 73.31540

[52] U.S. Cl. ................................................. 176/83
[51] Int. Cl.² ........................................... G21C 3/04
[58] Field of Search .............. 176/68, 72, 73, 74, 83

[56] References Cited
UNITED STATES PATENTS
3,184,392  5/1965  Blake .................................... 176/73
3,446,703  5/1969  Lyons et al. .......................... 176/68

Primary Examiner—Stephen C. Bentley
Attorney, Agent, or Firm—Cameron, Kerkam, Sutton, Stowell & Stowell

[57] ABSTRACT

Conventional fuel elements within the core of a nuclear reactor and especially a fast reactor are at least partly replaced by "safety elements" each formed by a stack of fissile fuel pellets enclosed in a can. Each pellet is provided with a central orifice so as to form an axial flow duct of sufficiently large cross-sectional area to ensure that the portion of fuel which is liable to melt as a result of a neutron-flux excursion flows under gravity to the bottom of the fuel element and has the effect of reducing the reactivity without damaging the fuel can.

10 Claims, 4 Drawing Figures

METHOD AND DEVICE FOR THE PASSIVE PROTECTION OF A NUCLEAR REACTOR

This invention relates to a method and a device for the passive protection of a nuclear reactor and especially a fast reactor.

More precisely, the invention is concerned with a method and a device which serve to produce a negative reactivity in the event of excessive increases in reactivity or temperature within the reactor if the active protection systems provided within this latter failed to come into operation.

It is known that, in a nuclear reactor, the absorbing rods which have the property of capturing neutrons can perform both the function of fine control of the reactor power and a safety function which consists in inserting said absorbing rods into the reactor core as rapidly as possible in order to achieve a subcritical condition immediately after indication of a fault which is liable to result in an accident (loss of power supply to control devices, loss of pressure or of means for circulating coolant, excessive increase in reactivity, temperature or pressure and so forth). Safety of the installation is accordingly obtained by introducing a certain degree of redundancy into the control means. The neutron-absorbing rods can be divided into separate groups actuated in a safety function by means of independent circuit systems for measurement, relay operation and control which are physically separate in all their paths.

Whatever provision may be made for redundancy of the reactor shutdown means, it is always found preferable to have recourse to a passive action rather than an active action in order to introduce into the reactor core the negative reactivity which is required in order to bring the reactor to a subcritical state. Thus in the event of a failure of the power supply which ensures control of the reactor or a loss of coolant flow, passive action under forces developed by gravity can be produced by means of an electromagnet which is operated from the same power supply system and initiates the free fall or "trip" of neutron-absorbing rods previously suspended above the reactor core.

Up to the present time, however, protection against excessive increases in reactivity or temperature has always entailed the use of a control loop formed by a detector which performs the measurement, by a device for processing said measurement and by an electromechanical relay system for transmitting motion to a neutron-absorbing rod. This control loop is therefore an active system with sections located outside the reactor core proper and is consequently more sensitive to hazards such as aircraft crashes, fires, sabotage, earthquakes or floods.

The present invention is precisely directed to a method and a device which circumvent the disadvantages mentioned in the foregoing insofar as they are strictly passive and located inside the reactor core.

The method of passive protection of a nuclear reactor core essentially consists in placing within said core a predetermined number of vertical fuel elements or so-called "safety" elements each provided with an axial duct of sufficiently large diameter to ensure that the fuel which forms the wall of said duct and which will melt first by reason of its initial temperature is capable of flowing freely under the action of gravity between the mid-height of said fuel element and the base thereof whenever a dangerous excursion of neutron-flux density occurs.

In a preferred alternative mode of execution of the method, the total number of normal fuel elements is replaced by safety elements.

Economic studies have in fact shown that it is more advantageous to design all the fuel elements in the form of safety elements having internal ducts of large diameter. The safety effect which is claimed to arise from differentiation of fuels remains valid insofar as refuelling does not involve the entire reactor core but only a portion of the core. In this case, the reactor accordingly contains at any given moment fuels of different ages in different states of reactivity and thermal equilibrium. Moreover, even in the case of identical fuels which have been loaded at the same moment, the position within the reactor core and the position with respect to the control rods produce different states of thermal equilibrium under normal operating conditions.

As a natural consequence of the foregoing, heterogeneity of the fuel elements is always ensured to a substantial degree and internal melt-down of fuel elements which are all assumed to be of the safety type according to this patent will therefore not be simultaneous.

Full advantage is thus taken of the intrinsic safety of the novel type of fuel in which the fuel material does not remain trapped in the central portion of the reactor core which has the highest temperature and is the most subject to can failures, with the result that fuel in the liquid state is much less liable to be ejected towards the coolant under the action of the internal pressure of the fission gases.

The device for carrying out the method is characterized in that each safety element is constituted in the same manner as normal fuel by a stack of fuel pellets enclosed in a can but differs in that each pellet is provided with a central opening having a cross-section such that the portion of molten fuel is capable of flowing under gravity to the bottom portion of said fuel element.

In accordance with a further characteristic feature of the invention, each safety element is provided in the lower portion thereof with a zone corresponding to the lower blanket assembly of the reactor core, said zone being formed of refractory material and provided over part of its height and at the top portion thereof with a central duct having substantially the same diameter as the duct formed in the fissile portion of the fuel element.

In a first alternative embodiment, the lower portion of the zone of refractory material is constituted by a solid pellet which is also formed of refractory material.

In a second alternative embodiment, the zone of refractory material comprises a central duct having a smaller diameter and opening into a chamber for the fission gases which is formed within the can of the fuel element beneath said zone, the lower portion of said chamber being such as to terminate in a crucible of refractory material.

A better understanding of the invention will in any case be gained from the following description which gives a number of examples of practical application of the method according to the invention and makes reference to the accompanying figures, wherein.

There will now be described the execution of the method as applied to the case of fast reactors in which the fuel elements are placed vertically and formed of pellets of sintered uranium oxide or any other solid chemical compound containing uranium and plutonium encased in vertical cylindrical cans which extend in a single piece to the full height of the reactor core.

Said sintered pellets are either solid or pierced vertically by a small central capillary orifice and are superposed so as to form a vertical column within the can. A few hundred of these vertical fuel elements are grouped together in the form of "fuel assemblies" and a few hundred assemblies in juxtaposed relation form the reactor core. The core which is thus formed imposes on each constituent fuel element a neutron flux density which is always higher at the center than at the periphery by reason of neutron leakage towards the exterior.

Along a vertical axis, the evolution of heat per unit of volume of fuel (which is assumed to be homogeneous in its enrichment in fissile isotopes within one and the same fuel element) is distinctly greater (at least twice as much) at the mid-height of the reactor core than at the bottom and top limits of this latter. In normal operation, the hottest point (approximately 2300°C) is therefore the center of the pellet which is located at the mid-height of the reactor core. In the event of an excessive temperature build-up resulting from an insufficient coolant flow rate or from an excessive increase in neutron flux density, the hottest point aforesaid will begin to melt at about 2800°C whereas along the can, the fuel which is cooler by 1500° to 2000°C will remain in the solid state and protect said can, the integrity of which is an essential and characteristic element of our method.

Figure 1:
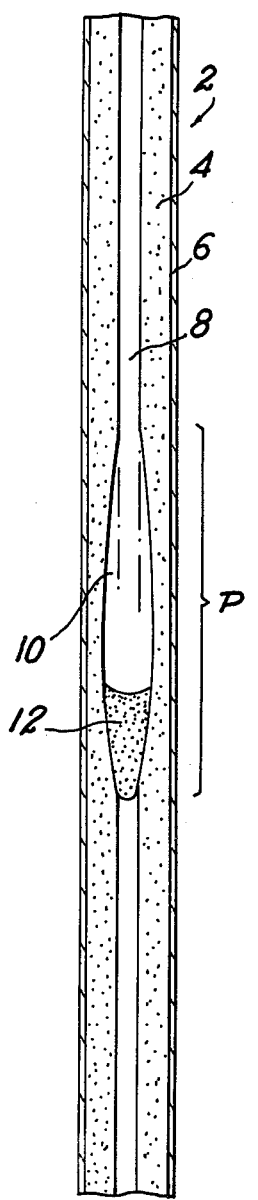
FIG. 1 is an axial sectional view showing an ordinary fuel element.

There is shown in FIG. 1 a fuel element 2 constituted by a stack of pellets 4 of uranium oxide or mixed oxide of uranium and plutonium surrounded by a metallic can 6 (for example of austenitic steel). There has been formed in the stack of oxide fuel pellets 4 an axial capillary duct 8. It is apparent that said axial duct has a small diameter in order to ensure that the volumetric void fraction within the reactor core remains of very small value: for example, if the diameter of the fuel element is 7 mm, the diameter of the duct has a value of 2 mm. Under the action of an excessive value of neutron-flux density and temperature prevailing within the reactor, it is observed that fusion of the oxide fuel takes place in the zones 10 over the entire periphery of the axial duct 8 within the central zone of the fuel element 2 as designated in the figure by the reference P. The molten fuel 12 collects in a drop which forms a plug on account of the small diameter of the duct 8. It can therefore be stated that the entire quantity of molten fuel thus remains within the zone P.

Figure 2:
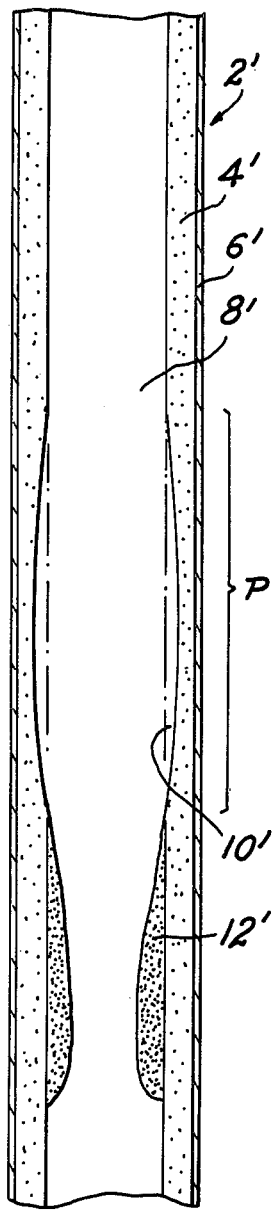
FIG. 2 is an axial sectional view of a fuel element which illustrates the method according to the invention.

There is shown in FIG. 2 a fuel element 2' or so-called safety element in accordance with the present invention as constituted by oxide fuel 4' and its protective can 6' with an axial duct 8' of large diameter. For example, this diameter has a value of 10 mm in respect of a diameter of the fuel element of 15 mm, which gives the same thickness of fuel in both cases. It is found that, in the zone P corresponding to the mid-height of the fuel element, fusion of the oxide takes place in the event of excessive elevation of the neutron flux density within the reactor. The fuel melts in the annular zone 10'. Since the diameter is of substantial value, the molten fuel 12' does not form a drop but moves down in the form of a ring along the internal walls of the duct 8' until it reaches the lower end of the fuel element. As long as the molten fuel 12' remains subjected to the neutron flux of the reactor core, the fuel is superheated in a liquid form and continues to flow downwards not only without solidifying against the wall but while even having a tendency to carry down part of this latter in liquid form by reason of the ovethickness of fuel which exists at the time of downward motion of said liquid ring 12'.

It is therefore apparent that, by virtue of this method, part of the fissile material is automatically removed in the zone of maximum neutron flux and transferred into a zone of lower flux, thereby reducing the core reactivity and consequently even stopping the reactivity excursion.

It should be pointed out that the device comes into operation only after and then in parallel with the negative temperature coefficients in order to control reactivity and temperature excursions. In consequence, the function of the device is solely to enhance a counter-reaction when this latter has not been of sufficient value to control the excursion before core meltout takes place. The time constant which is inherent to this safety device and is related to the time constant of an absorber rod which falls under the action of gravity is of undoubted significance when it is necessary to stop a prompt reactivity excursion at a low level but, when utilized in combination with the very short time constant of the Doppler effect, it can result in a general counter-reaction which is both effective and reliable.

As will be readily understood, the diameter to be given to the axial duct 8 or 8' is clearly dependent on the nature of the fissile fuel and more precisely on the viscosity of the liquid formed.

Figure 3:
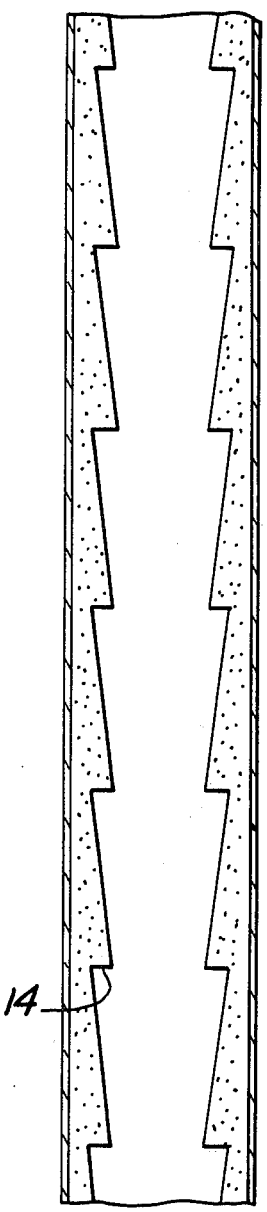
FIG. 3 is an alternative mode of application of said method.

If it should prove as a result of initial experimentation with an internal bore having vertical walls that sliding of the liquid ring 12' is neither sufficiently rapid nor of sufficient duration, the internal walls of the axial duct 8' can be given any shape whose intended function is to promote the formation of drops which move down at least partially in free fall and break-up by successive impacts. By way of example and as shown in FIG. 3, the duct can be given a sawtooth profile 14 which can readily be obtained by stacking of sintered pellets having a frusto-conical internal hole.

Figure 4:
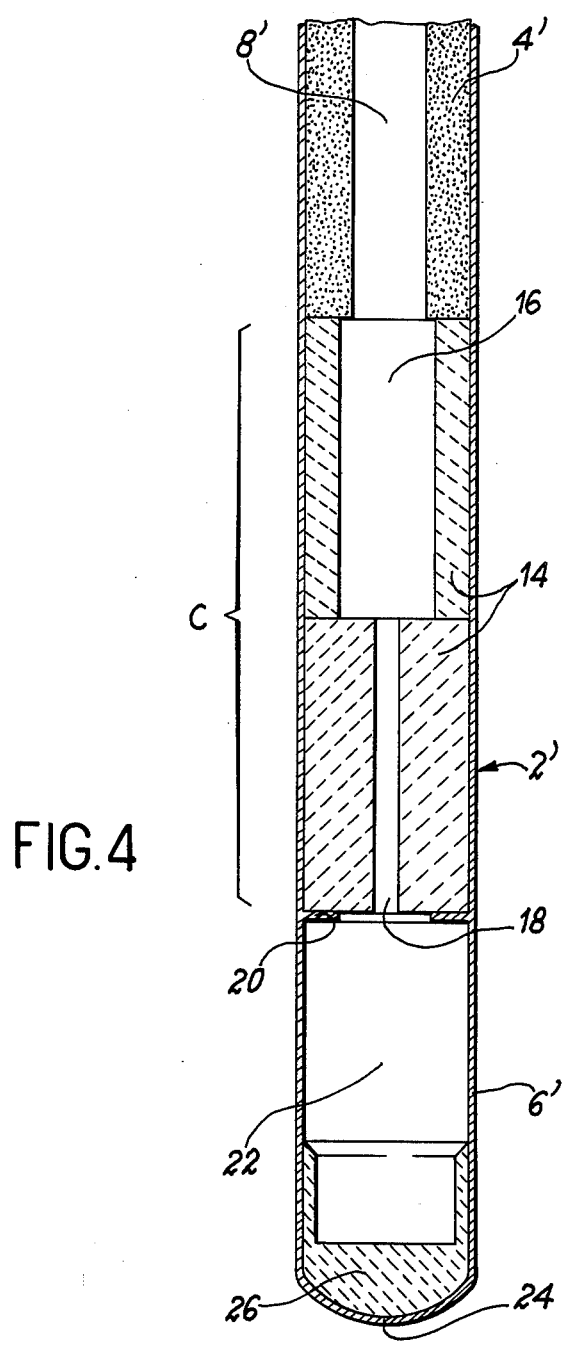
FIG. 4 is an axial sectional view of the lower portion of a fuel element.

There is shown in FIG. 4 an alternative form of construction of the safety element in which an assembly for receiving the molten fuel is added to the lower portion of the fuel element (beneath the fissile zone).

The safety element 2' (only the lower portion of which is illustrated) is provided in the central zone corresponding to the reactor core with a stack 4' of fissile pellets which may be formed of $UO_2$ or of $UO_2$ and $PUO_2$, for example. Said stack is placed within the can 6' of the fuel element and pierced by a central duct 8' having a sufficient diameter to permit the flow of part of the material which is liable to melt.

In the zone corresponding to the lower blanket assembly of the reactor core and designated by the letter C, provision is made for a member 14 of fertile material which can be either natural uranium oxide, depleted uranium oxide (containing a very low percentage of $U_{235}$) or thorium oxide.

The member 14 is provided at the upper end (namely the end nearest the reactor core) with a central duct 16 having a diameter which is equal to or slightly larger than the diameter of the duct 8', the two ducts being intended to communicate with each other. At the lower end thereof, the member 14 is pierced by a central duct 18 which opens into the duct 16 and has a diameter which is distinctly smaller than this latter. By way of example, provision is made for a diaphragm 20 which is rigidly fixed to the can 6' and serves to support said member 14. Beneath the zone C which corresponds to the lower blanket assembly, there is formed within the can a chamber 22 for the fission gases and said chamber communicates through the narrow duct 18 with the ducts 16 and 8'. The base 24 of the can is lined with a crucible 26 of refractory material. In addition to the substances mentioned earlier for the fabrication of the member 14, boron carbide can be employed for the fabrication of the crucible 26.

The operation of the lower portion of the safety element is as follows:

The molten fissile material moves as far downwards as possible under its own impetus before finally adhering to the refractory wall of the duct 16 of the member 14. This portion of the duct 16 constitutes a first crucible for the molten fissile material.

Each safety element thus has its own internal catchpot. If all the fuel elements are safety elements, there is thus provided a molten-core catchpot which is integrated withh the interchangeable fuel assemblies. This arrangement has accordingly solved the problem of fitting a core catcher which is effective and inexpensive and comes into operation before irreparable damage is caused to the reactor block.

The presence of the chamber 22 makes it possible to increase the rate of downward motion of the molten fuel within the central duct (8' and 16) and thus to counteract a power excursion more rapidly on condition that a full top blanket is adopted. In fact, at the moment of a power excursion, the fission gas is in pressure equilibrium and its temperature rises sharply within the duct 8' formed in the fissile portion. If the only escape route provided for the gases is the bottom chamber 22 which remains at the same temperature as the inlet sodium, the gas under pressure contained in the central duct 8' is partly expelled towards the bottom and can thus play in accelerating the downward motion of the molten fuel ring and even in entraining finely dispersed droplets at an even higher speed. This phenomenon is accentuated if part of the molten fuel begins to vaporize. The fissile material will then leave the maximum flux zone both in the liquid phase and in a gas phase which accelerates the liquid.

The duct 18 permits this gas-phase flow towards the fission chamber 22. Although the greater part of the molten fissile material is intended to undergo resolidification within the first crucible formed by the member 14 and to become attached to this latter, provision is made for a second crucible 26 which serves as an additional safety feature.

The refractory crucible 26 forms both a core catcher which is placed as a second line of defense and a second lower blanket which is capable of producing a further attenuation of the neutron flux. Said crucible 26 is placed after a zone in which the thickness of coolant (liquid sodium) will have softened the neutron spectrum and has higher capture cross-sections.

In a simplified form of construction, the duct 18 is no longer provided and the crucible 26 is similarly dispensed with. A solid pellet of refractory material is therefore placed at the lower end of the member 14.

Should it be found preferable not to replace all the fuel elements by safety elements, the number of fuel elements of the safety type is determined by calculating the mass of fissile product which is intended to be displaced for example from the mid-height of the reactor core to the lower portion of this latter in which the flux is reduced by one-half and the square of the flux is reduced to one-quarter of its initial value. This accordingly determines the required number of safety fuel elements having axial ducts of large diameter for ensuring that the desired negative reactivity is obtained.

It is possible either to place all the safety fuel elements in a certain number of fuel assemblies which consist only of elements of this type or to distribute the safety fuel elements within all the fuel assemblies. It can be noted in the first place that it is advantageous in a fast reactor to place all the safety elements at the center of the core as seen in plan since it is at this point that the neutron flux density has the highest value.

It will finally be noted that the safety elements in accordance with the invention have the design function both of fuel elements and of neutron-absorbing rods as well as a safety function, with the result that the use of such elements in a reactor core would lead to an advantage in the event that the number of neutron-absorbing rods could be reduced. In some cases this advantage would compensate for the penalty attached to the introduction of a not-negligible void fraction at the center of the reactor core.

As stated earlier, the system is intended to reduce to a very considerable extent the consequences of highly improbable accidents of the type described by Bethe and Tait which begins with complete meltout of the central third of the reactor core (including cans) which moves into the coolant location within the lower third. The first stage of the Bethe and Tait accident is reproduced by the safety device but limited in extent and guided within the fuel itself in order to leave the can of the central portion intact. There will thus be no possibility either of subsequent compaction or of reaction with the coolant.

Since this safety device is intended to come into operation only in very infrequent instances, it is important to note that its main properties are reliability and absence of spurious reactor trips.

What I claim is:

1. A method of passive protection of a nuclear reactor and especially a fast reactor, the steps of replacing at least part of the conventional fuel elements within the core of said reactor by a number of vertical safety fuel elements, forming each safety fuel element with an axial flow duct having a cross-section of large diameter having a ratio with respect to the diameter of the fuel element on the order of 10/15, receiving in said flow duct the portion of fuel which is capable of melting within the central portion of said element under the action of a neutron-flux excursion and flowing the melted fuel portion under gravity from the mid-height of said element to the base thereof thus reducing the reactivity without thereby impairing the fuel can.

2. A device for the passive protection of a nuclear reactor having vertical fuel elements including safety fuel elements wherein each safety element is constituted by a stack of fissile fuel pellets enclosed in a can, each pellet having a central orifice of large diameter having a ratio with respect to the diameter of the fuel element on the order of 10/15 to ensure that the portion of molten fuel melting within the central portion of the element can flow under gravity to the bottom portion of said fuel element.

3. A device according to claim 2, wherein each safety element is provided at the lower end thereof with a member corresponding to the lower fertile blanket of the reactor core, said member being formed of refractory material and provided over part of its height and at the top portion thereof with a central duct having substantially the same diameter as the duct formed in the fissile portion of said fuel element.

4. A device according to claim 3, wherein the member corresponding to the lower blanket is provided at the top portion thereof with a central duct having a diameter which is substantially equal to that of the fissile portion of the fuel element and wherein said member terminates at the lower end thereof in a solid pellet of refractory material.

5. A device for the passive protection of a nuclear reactor having vertical fuel elements including safety fuel elements wherein each safety element is constituted by a stack of fissile fuel pellets enclosed in a can, each pellet having a central orifice of large diameter having a ratio with respect to the diameter of the fuel element on the order of 10/15 to ensure that the portion of molten fuel melting within the central portion of the element can flow under gravity to the bottom portion of said fuel element, a member for each safety element at the lower end thereof corresponding to the lower fertile blanket of the reactor core, said member being formed of refractory material and provided over part of its height and at the top portion thereof with a central duct having substantially the same diameter as the duct formed in the fissile portion of said fuel element; said member having at the bottom portion thereof an axial duct of smaller diameter and beneath said member a chamber for the fission gases which is limited by the bottom face of said member and by the can and at the lower end thereof by a crucible of refractory material on the bottom end-wall of said can.

6. A device according to claim 5, wherein the refractory material is an oxide of fertile substance selected from the group comprising depleted uranium, natural uranium and thorium.

7. A device according to claim 5, wherein the refractory material which forms the bottom crucible is selected from the group comprising depleted uranium, natural uranium, thorium and boron carbide.

8. A device according to claim 7, wherein the safety elements are grouped together in a predetermined number of fuel assemblies of the reactor core.

9. A device according to claim 7, wherein the safety elements are uniformly distributed within all the fuel assemblies of the reactor core.

10. A device according to claim 7, wherein all the fuel elements of the reactor core are safety elements.

* * * * *